(12) United States Patent
Takata et al.

(10) Patent No.: US 7,322,639 B2
(45) Date of Patent: Jan. 29, 2008

(54) FRONT STRUCTURE OF VEHICLE (75) Inventors: Toshio Takata, Fuchu-cho (JP);
Kazuma Kondou, Fuchu-cho (JP);
Yasunori Kageyama, Fuchu-cho (JP);
Toshio Sakamoto, Fuchu-cho (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 11/583,791

(22) Filed: Oct. 20, 2006

(65) Prior Publication Data
US 2007/0091624 A1 Apr. 26, 2007

(30) Foreign Application Priority Data
Oct. 21, 2005 (JP) .............................. 2005-306759

(51) Int. Cl.
B60J 7/00 (2006.01)
F21V 7/04 (2006.01)

(52) U.S. Cl. ........................... 296/187.09; 296/187.03; 362/507

(58) Field of Classification Search ........... 296/187.03, 296/187.09, 187.1; 362/507, 549, 390
See application file for complete search history.

(56) References Cited

U.S. PATENT DOCUMENTS 6,190,030 B1 * 2/2001 Chase ........................ 362/549

FOREIGN PATENT DOCUMENTS

JP    11-171041    6/1999
JP    2005-206141  8/2005

* cited by examiner

Primary Examiner—Joseph D. Pape
(74) Attorney, Agent, or Firm—Staas & Halsey LLP (57) ABSTRACT Disclosed is a front structure of a vehicle, which comprises a pair of right and left front side frames, a shroud installed between respective front ends of the side frames, a pair of right and left headlamps each arranged on a lateral side of a corresponding one of laterally opposite sidewalls of the shroud and provided with a headlamp housing serving as an outer shell thereof, and a hood panel adapted to cover above the shroud when it is in a fully closed position. In this front structure, each of the headlamp housings has a contact portion located below a corresponding one of opposite front lateral ends of the hood panel in the fully closed position, and each of the sidewalls of the shroud has an upper region provided with a catch portion which is disposed above and in opposed relation to the contact portion of a corresponding one of the headlamp housings and adapted to come into contact with the contact portion when the headlamp housing is applied with an eternal impact force, so as to restrict an upward movement of the headlamp.

7 Claims, 12 Drawing Sheets

FRONT STRUCTURE OF VEHICLE

BACKGROUND OF THE INVENTION

1. Field of the Invention

The present invention relates to a vehicle front structure, and more specifically to a vehicle front structure having a headlamp arranged on a lateral side of a shroud.

2. Description of the Related Art

Generally, a shroud is disposed in a front zone of a vehicle to receive therein a radiator core, a cooling fan and other component. Japanese Patent Laid-Open Publication No. Hei 11 (1999)-171041 discloses a resin shroud having a large number of members integrally molded in a single piece using a resin material. This resin shroud extends laterally (i.e. in a width direction of a vehicle body) and is fastened to a part of vehicle-body member, such as a fender panel, a wheel house or a cross member. In particular, this resin shroud has lateral ends each extending rearward and has a corner region located between a laterally extending portion and each of the rearward extension portions. The corner region is formed with an opening for allowing one of a pair of headlamps to be mounted thereto.

Although the above shroud enables to receive the headlamps therein, the rigidity of the shroud will inevitably deteriorate due to its combined structure consisting of the laterally and longitudinally extending portions. In view of this disadvantage, Japanese Patent Laid-Open Publication No. 2005-206141 discloses a technique in which each of a pair of headlamps is arranged on a lateral side of a corresponding one of laterally opposite sidewalls of a shroud, i.e., outside the shroud, without receiving the headlamps in the shroud, to avoid enlargement of the shroud and ensure required rigidity thereof.

In the structure disclosed in JP2005-206141, however, each of the headlamps is not received in the shroud. Thus, if the headlamp has external impact by force exerted in directions such as rearward or laterally inward of a vehicle body, the headlamp is likely to be moved laterally inward or detached from the vehicle body. Particularly there is likelihood that the headlamp would push the front lateral end of a hood panel upward and additionally cause damages in the hood panel when the external impact is exerted in the headlamp. This would occur because a hood panel is provided in a front zone of a vehicle to cover an engine compartment and a shroud when the hood panel is in a fully closed position. Thus, if the headlamp housing which receives therein the headlamp is located even slightly below a front lateral end (a corner region between a laterally extending front edge and a longitudinally extending side edge) of the hood panel in the fully closed position, the headlamp housing is likely to push the front lateral end of the hood panel upwardly when the headlamp housing is moved laterally inward or detached from the vehicle and therefore moved upward due to impact force applied thereto.

In view of the above problem in a vehicle front structure, it is an object of the present invention to provide measures for preventing a headlamp arranged on a lateral side of a shroud from being moved upward due to external impact force to cause damages in a hood panel.

SUMMARY OF THE INVENTION

In order to achieve the above object, the present invention provides a front structure of a vehicle which is provided with a pair of right and left front side frames, a shroud installed between respective front ends of the side frames, a pair of right and left headlamps each arranged on a lateral side of a corresponding one of laterally opposite sidewalls of the shroud, a headlamp housing serving as an outer shell of the front structure, and a hood panel adapted to cover above the shroud when it is in a fully closed position. In this front structure, each of the headlamp housings has a contact portion located below a corresponding front lateral ends of the hood panel in the fully closed position, and each of the sidewalls of the shroud has an upper region provided with a catch portion which is disposed above and in opposed relation to the contact portion of a corresponding one of the headlamp housings and adapted to come into contact with the contact portion when the headlamp housing is applied with external impact force, so as to restrict an upward movement of the headlamp.

These and other objects, features, and advantages of the invention will become more apparent upon reading the following detailed description along with the accompanying drawings.

DETAILED DESCRIPTION OF THE PREFERRED EMBODIMENTS OF THE INVENTION

Figure 1:
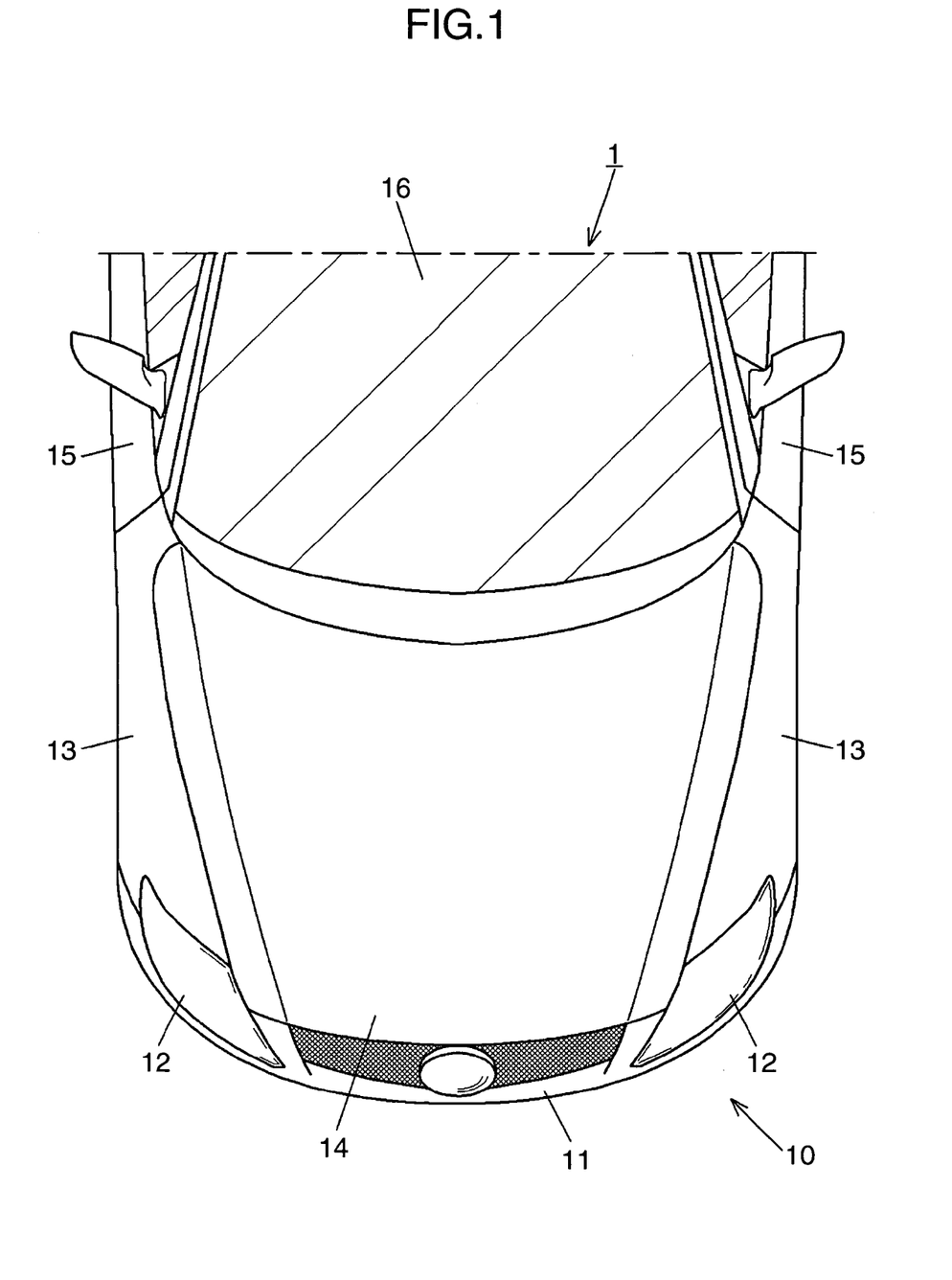
FIG. 1 is a top plan view showing a front structure of a vehicle, according to a preferred embodiment of the present invention.

FIG. 1 is a top plan view showing a front structure 10 of a vehicle 1, according to one embodiment of the present invention.

Referring to FIG. 1, the front structure 10 of the vehicle 1 is provided with a front bumper 11, a pair of right and left headlamps (more specifically, a pair of right and left combination headlamps each incorporating a headlight, a direction indicator and others in an integrated manner) 12, 12, a pair of right and left fender panels 13, 13 and a hood panel 14, as is shown in external view. The headlamp 12 has a relatively elongated shape extending rearward along a corner region between a front edge and a corresponding one of laterally opposite side edges of the vehicle 1. Each of a pair of right and left door panels 15, 15 is disposed to extend rearward continuously from a rear edge a corresponding one of the fender panels 13, 13, and a front windshield glass 16 is disposed to extend upward from a rear edge of the hood panel 14.

Figure 2:
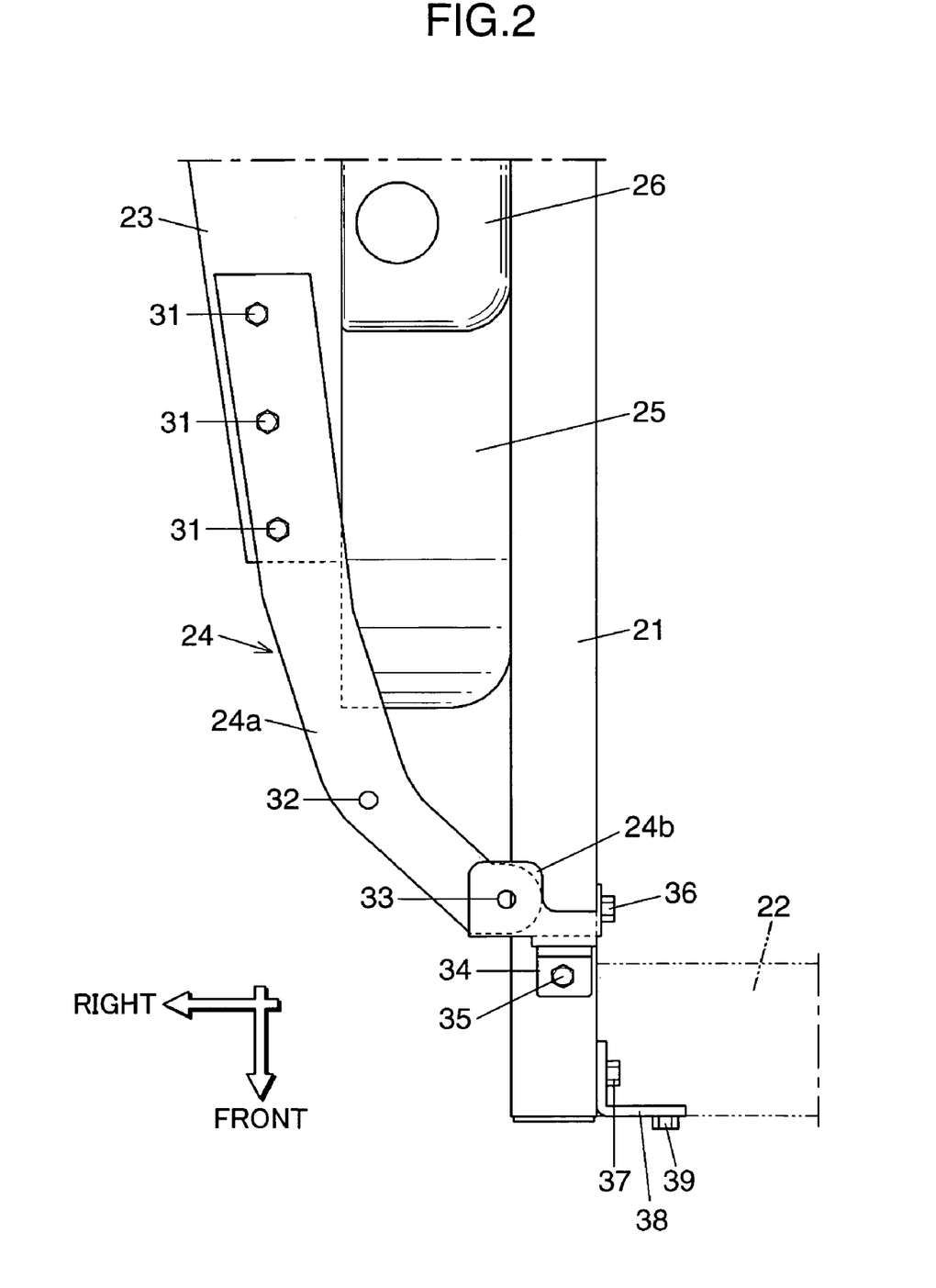
FIG. 2 is an enlarged top plan view showing an internal structure of a right front zone of the vehicle, wherein a shape of a shroud is schematically illustrated, and indicated by two-dot chain lines.

FIG. 2 is an enlarged top plan view showing an internal structure of a right front zone of the vehicle 1. A left front zone of the vehicle 1 has the same structure corresponding thereto. A pair of right and left front side frames 21, 21 (only the right front side frame is illustrated in FIG. 2) are disposed to extend frontward from a dash panel (not shown) dividing an engine compartment and a passenger compartment. A shroud 22 is installed between respective front ends of the front side frames 21, 21 to extend laterally (i.e., in a width direction of a vehicle body). In this embodiment, the shroud 22 is a resin shroud having a large number of members integrally molded in a single piece using a resin material.

Figure 3:
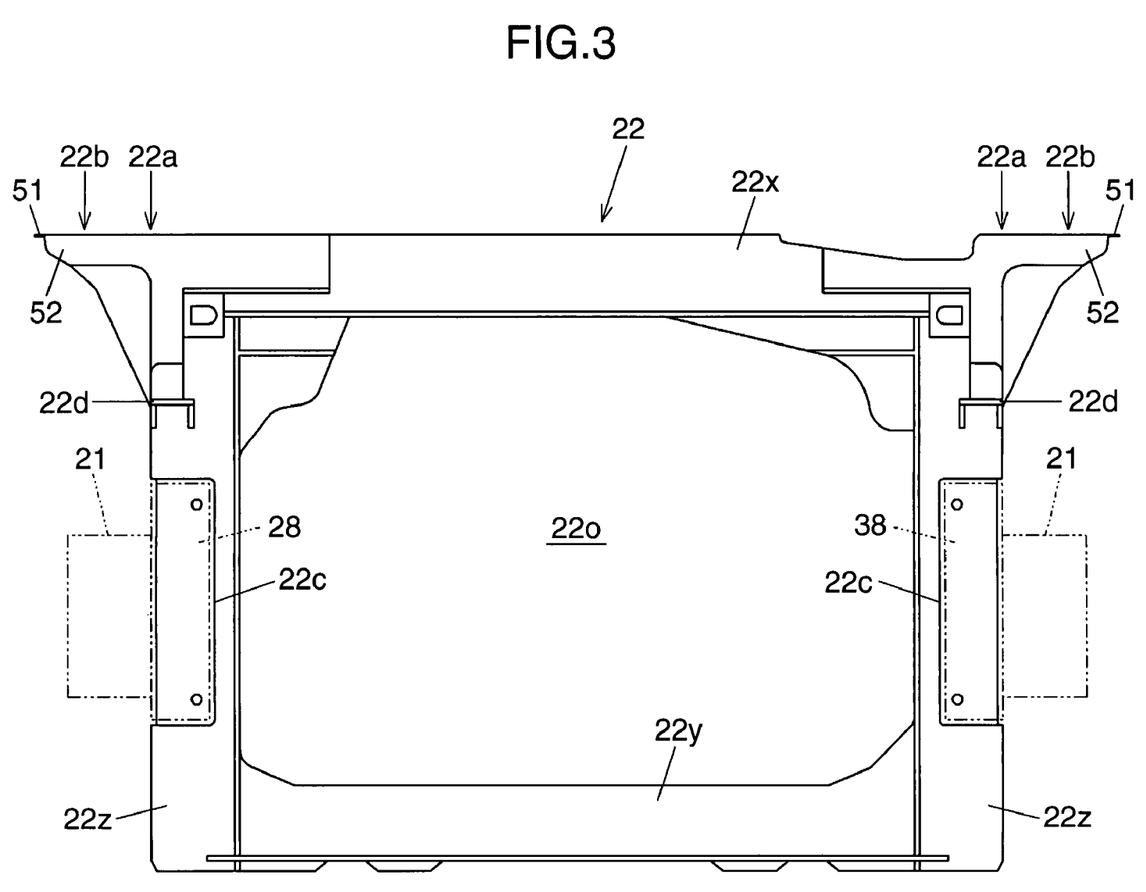
FIG. 3 is a front view showing the entire structure of the shroud.

As shown in FIG. 3, the resin shroud 22 is formed in a rectangular frame-like shape which includes an upper portion 22x defining an upper edge thereof, a lower portion 22y defining a lower edge, and a pair of right and left side portions 22z, 22z defining laterally opposite side edges. These portions of the resin shroud 22 define a central opening 22o for receiving therein a radiator core, a cooling fan and other component.

Figure 4:
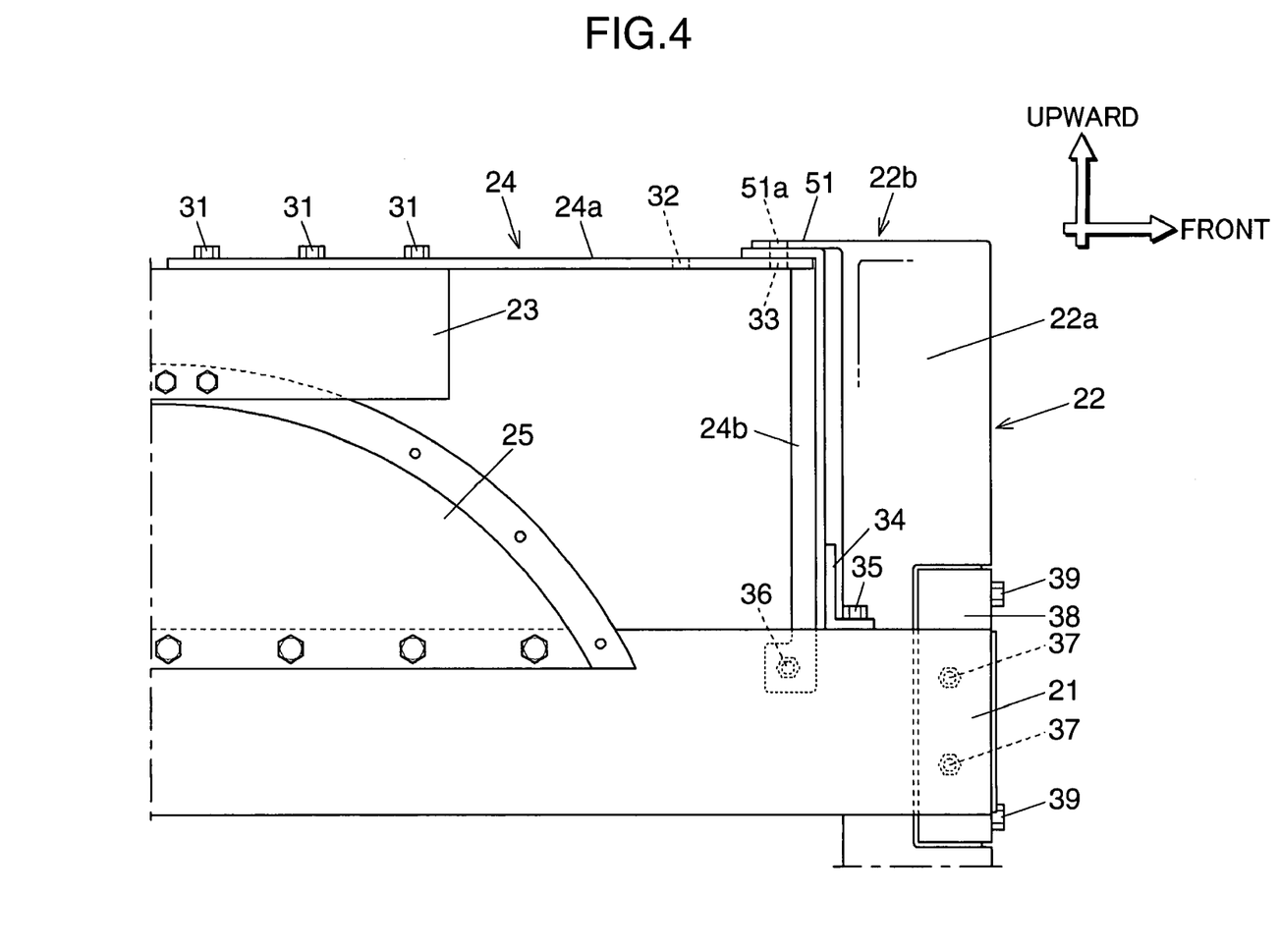
FIG. 4 is a right side view corresponding to the area of FIG. 2, wherein the shape of the shroud is schematically illustrated.

As shown in FIG. 4, the resin shroud 22 is fastened to each of the front side frames 21, 21 using a connection bracket 38 and a plurality of bolts 37, ---, 37, 39, ---, 39. As shown in FIG. 3, each of the side members 22z, 22z of the resin shroud 22 is formed with a depression 22c in which the connection bracket 38 is to be fitted. Although not illustrated, the resin shroud 22 is further fastened to respective upper surfaces of the front side frames 21, 21 using appropriate brackets and fasteners.

Referring back to FIG. 2, each of a pair of right and left upper frames (given vehicle-body members) 23, 23 (only the right upper frame is illustrated in FIG. 2) is arranged above and on a lateral side of a corresponding one of the front side frames 21, 21 (see FIG. 4). Each of a pair of right and left lamp brackets 24, 24 includes a rear member 24a having a rear end fastened to an upper surface of a corresponding one of the upper frames 23 using a plurality of bolts 31, ---, 31. The rear member 24a extends frontward from the upper frame 23 while curving inward (i.e., in an inward direction relative to the vehicle body). The lamp bracket 24 further includes a front member 24b overlappingly connected to a front end of the rear member 24a.

As shown in FIG. 4, the front member 24b is formed to extend downward from the junction with the rear member 24b, and fastened to an upper surface of a corresponding one of the front side frames 21, 21 using a bolt 35. The front member 24b is further fastened to a laterally inward side surface of the front side frame 21 using a bolt 36 (see FIG. 2). That is, the lamp bracket 24 is bridged between the rearward upper frame 23 and the front end of the front side frame 21, as a whole.

Returning to FIG. 2, a wheel house 25 for housing a front wheel and a suspension tower 26 for housing a front suspension are arranged between corresponding ones of the front side frames 21, 21 and the upper frames 23, 23. Each of these elements 25, 26 has a conventional structure with no contribution to features of the present invention, and their further description will be omitted.

Figure 5:
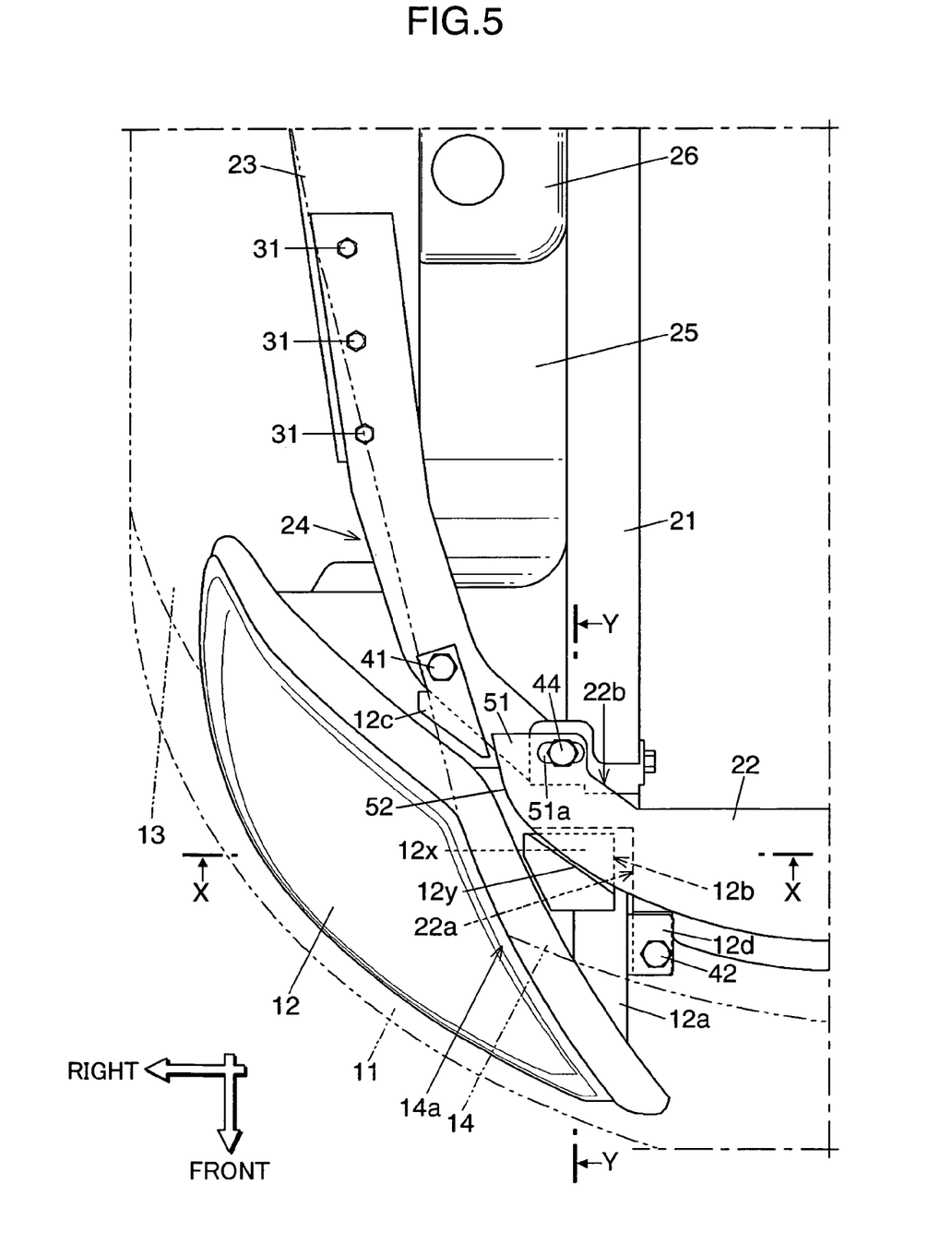
FIG. 5 is an enlarged top plan view corresponding to FIG. 2 in a state after a headlamp is mounted.
Figure 6:
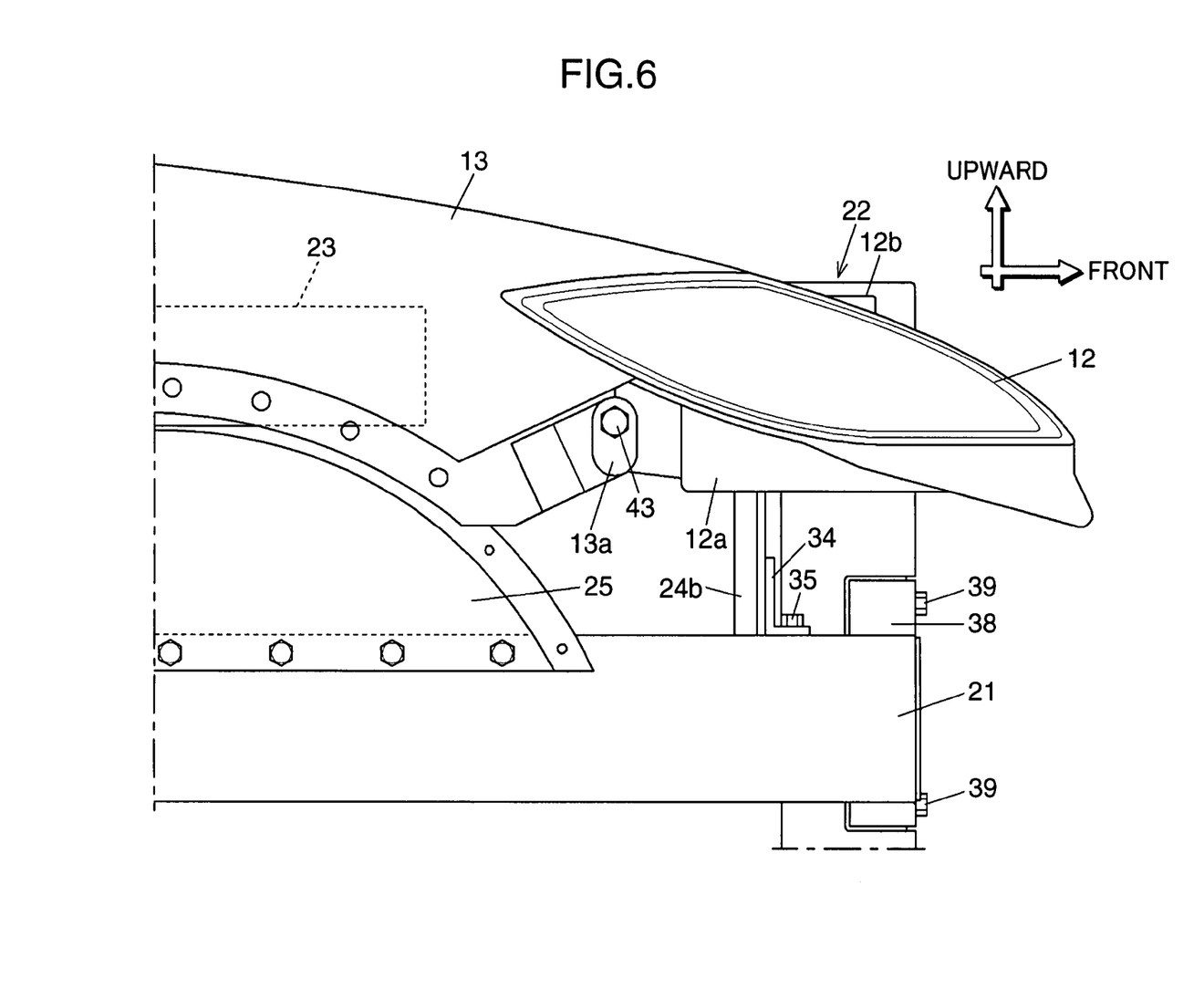
FIG. 6 is a right side view corresponding to FIG. 4 in a state after a fender panel and the headlamp are mounted.

As shown in FIG. 5, in this embodiment, each of the headlamps 12, 12 is arranged on lateral side of a corresponding one of laterally opposite sidewalls 22a of the resin shroud 22 (see FIGS. 3 and 4), i.e., outside the shroud 22. The headlight 12 is provided with a headlamp housing 12a serving as an outer shell thereof. The headlamp housing 12a is fastened to the lamp bracket 24 through a first mounting bracket 12c using a bolt 41. The headlamp housing 12a is further fastened to the shroud 22 using a bolt 42. Furthermore, as shown in FIG. 6, the headlamp housing 12a is fastened to the fender panel 13 through a second mounting bracket 12d using a bolt 43 (the fender panel 13 has a lower edge region formed as a lamp-housing mounting portion 13a).

As shown in FIG. 5, the hood panel 14 is adapted to cover the shroud 22 when the hood panel 14 is in a fully closed position, and each of the headlamp housings 12a is formed with a contact portion 12b located below a corresponding one of opposite front lateral ends (right and left corner regions between a laterally extending front edge and respective longitudinally extending side edges) of the hood panel 14 in the fully closed position.

Figure 7:
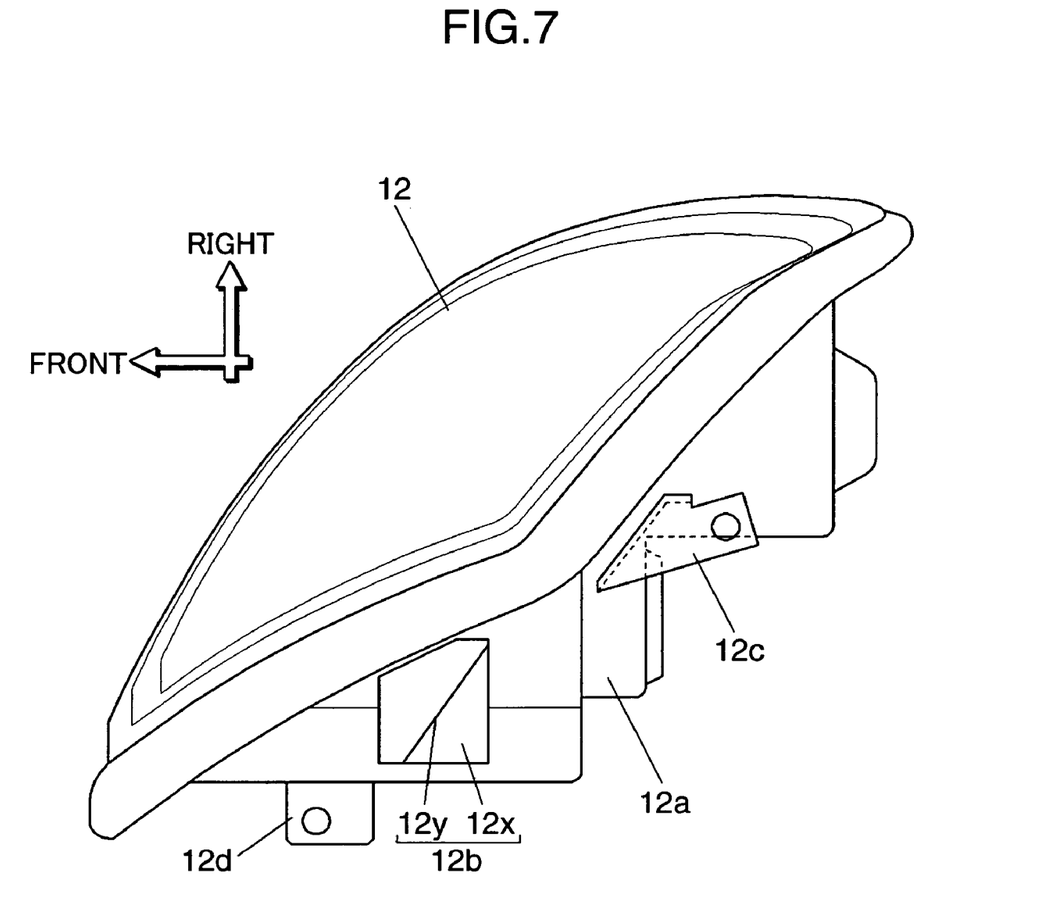
FIG. 7 is a top plan view showing the entire structure of the headlamp.
Figure 8:
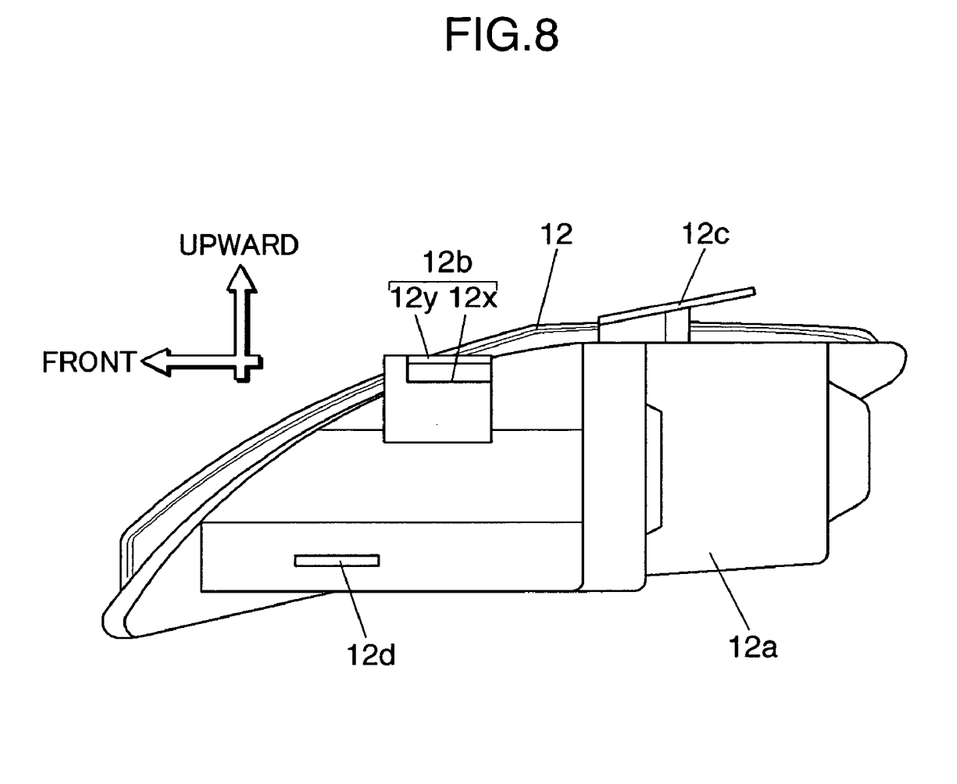
FIG. 8 is a left side view showing the headlamp.

As shown in FIGS. 7 and 8, the headlamp housing 12a has an upper surface provided with the contact portion 12a and the first mounting bracket 12c. The headlamp housing 12a has a laterally inward side surface provided with the second mounting bracket 12d. These members 12b, 12c, and 12d are integrally molded in a single piece using a resin material together with the lamp housing 12a.

Figure 9:
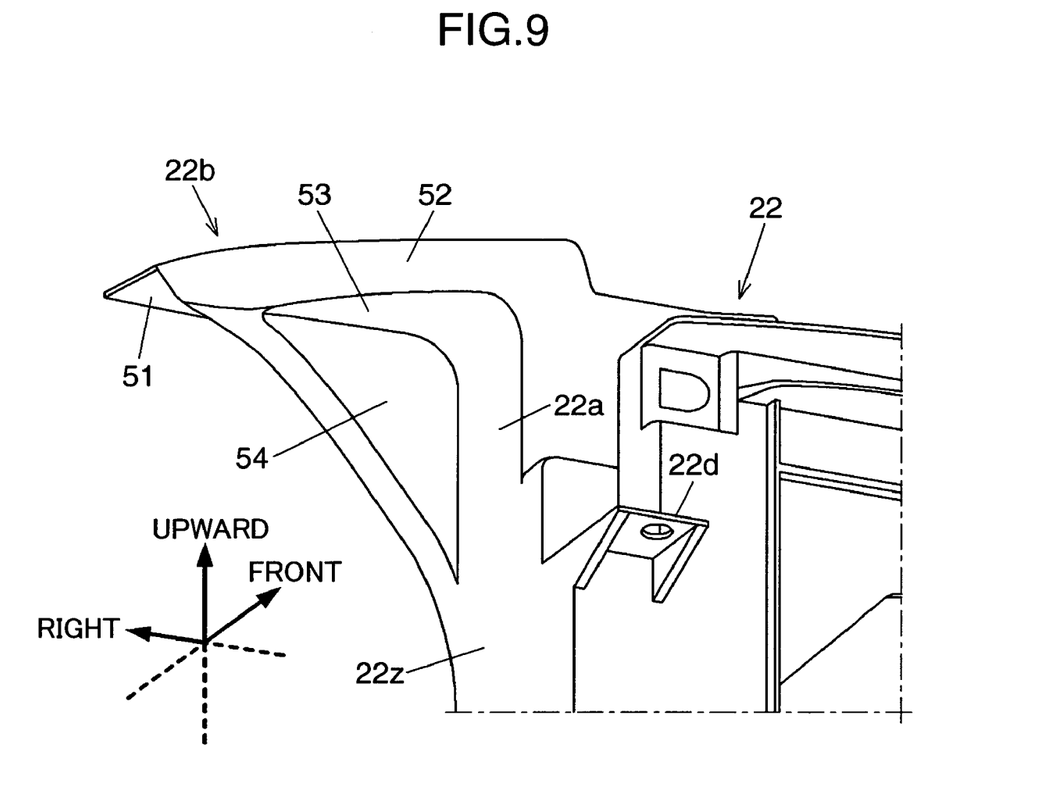
FIG. 9 is a fragmentary enlarged perspective view showing a right upper corner region of the shroud, viewed obliquely upward.

As shown in FIG. 2, the lamp bracket 24 is formed therein an opening 32 (see FIG. 4) for allowing the bolt 41 to penetrate therethrough. As shown in FIG. 9, the shroud 22 is formed with a ledge portion 22d for seating the second mounting bracket 12d (see FIG. 3).

Further, as shown in FIG. 9, each of the sidewalls 22a of the shroud 22 has an upper region formed with a catch portion 22b protruding laterally outward therefrom. The catch portion 22b has an upper horizontal wall 51 (see FIG. 3), and a rear end of the upper horizontal wall 51 is fastened to the front end of the lamp bracket 24 using a bolt 44, as shown in FIG. 5. For this purpose, the lamp bracket 24 is formed with a hole 33 (see FIG. 4) for allowing the bolt 44 to penetrate therethrough, as shown in FIG. 2, and the upper horizontal wall 51 of the shroud 22 is formed with an elongated hole 51a for allowing the bolt 44 to penetrate therethrough, as shown in FIGS. 5 and 10.

As shown in FIG. 5, the catch portion 22b of the shroud 22 is also formed to protrude above and in adjacent relation to the contact portion 12b of the headlamp housing 12a. In addition to the upper horizontal wall 51 which extends from the sidewall 22a of the shroud 22 toward above the contact portion 12b of the headlamp housing 12a, the catch portion 22b includes a first vertical wall 52 which extends downward from an front edge of the upper horizontal wall 51 while connecting with the sidewall 22a of the shroud 22, and a lower horizontal wall 53 which extends upward from a lower edge of the first vertical wall 52 and extends horizontally rearward while connecting with the sidewall 22a of the shroud 22. Thus the catch portion 22b is formed in a horizontally elongated rectangle shape in vertical cross section, as shown in FIGS. 9 and 10.

Figure 11:
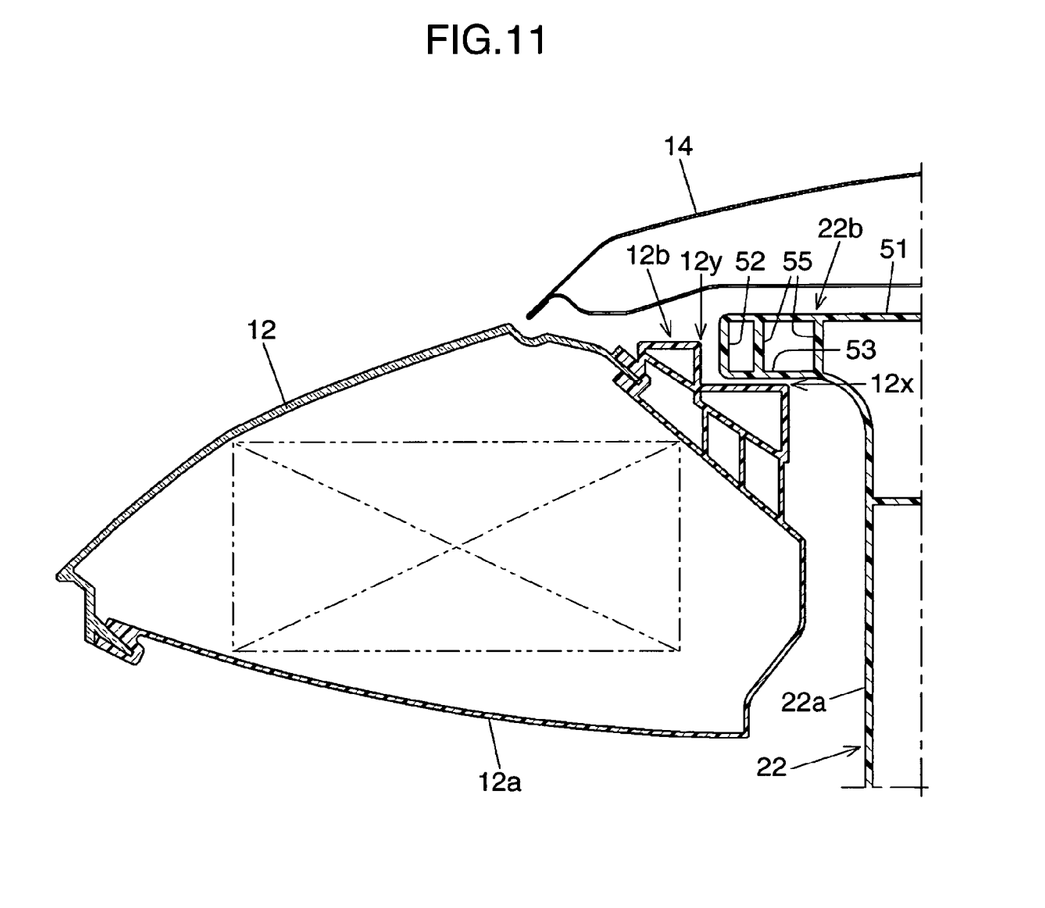
FIG. 11 is an end view along the cutting plane line X-X in FIG. 5, wherein an internal structure of the headlamp is omitted.

As best shown in FIG. 11, in the horizontally elongated internal space, the catch portion 22b is formed with a plurality of ribs 55 each extending vertically between the upper horizontal wall 51 and the lower horizontal wall 53 while connecting with the first vertical wall 52.

Figure 10:
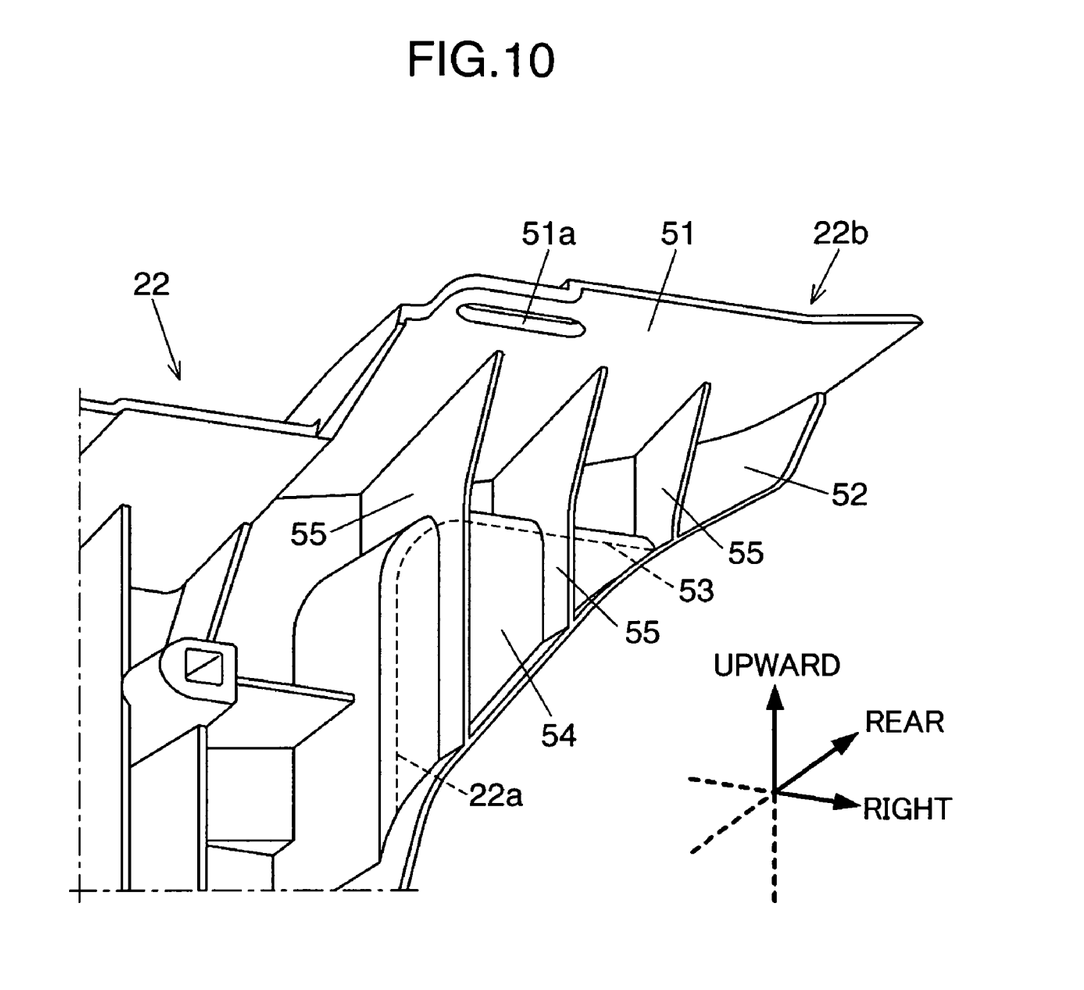
FIG. 10 is a fragmentary enlarged perspective view corresponding to the area of FIG. 9, viewed obliquely upward from the side of a rear surface of the right upper corner region.

As shown in FIGS. 9 and 10, the catch portion further includes a second vertical wall 54 extending downward from a rear edge of the lower horizontal wall 53 while connecting with the sidewall 22*a* of the shroud 22. Further, as best shown in FIG. 10, one or more of the ribs 55 are formed to extend integrally to the second vertical wall 54 beyond the lower horizontal wall 53.

Figure 12:
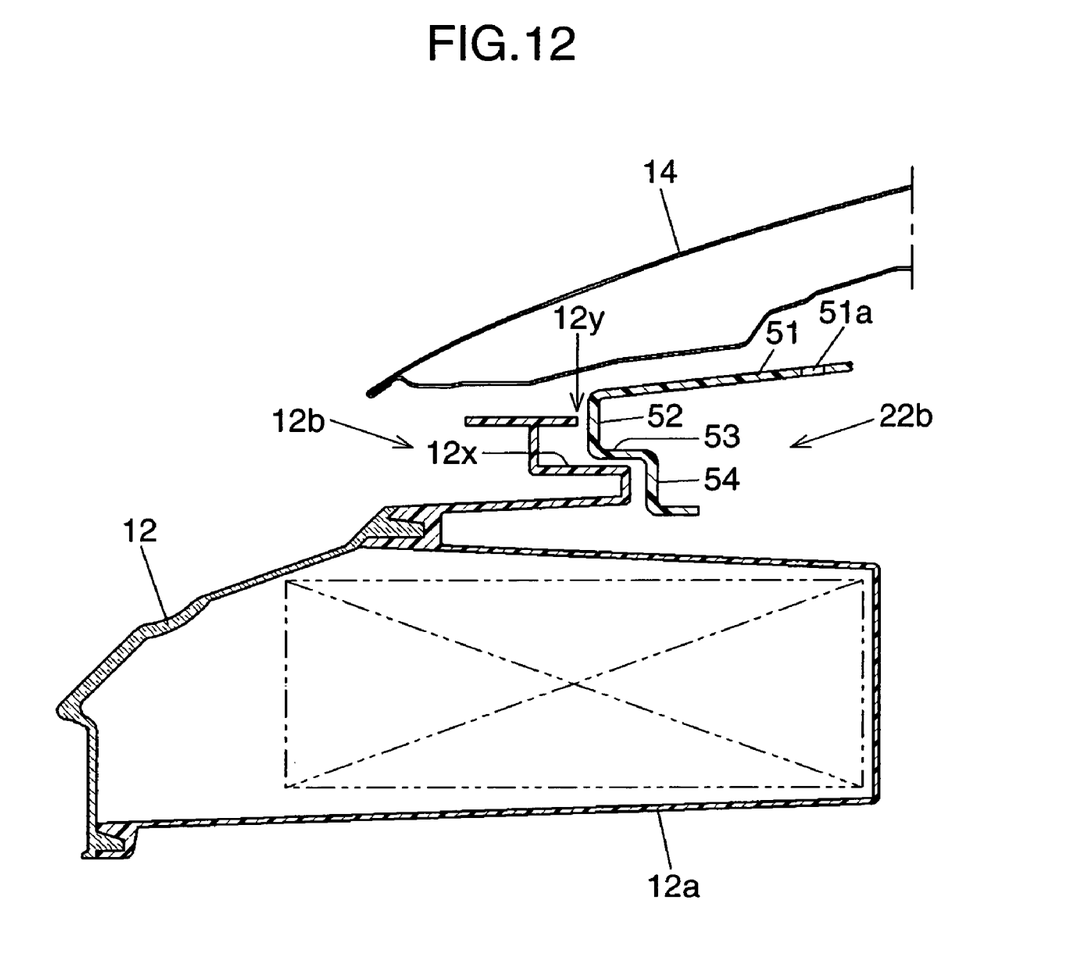
FIG. 12 is an end view along the cutting plane line Y-Y in FIG. 5, wherein the internal structure of the headlamp is omitted.

As shown in FIGS. 7 and 8, the contact portion 12*b* of the headlight housing 12*a* has a horizontal surface 12*x* and a vertical surface 12*y*. Among them, as shown in FIGS. 5, 11 and 12, the horizontal surface 12*x* is disposed in vertically opposed relation to the lower horizontal wall 53 of the catch portion 22*b* of the shroud 22, and adapted to come into contact with the lower horizontal wall 53 in the vertical direction. The vertical surface 12*y* is disposed in horizontally opposed relation to the first vertical wall 52 of the catch portion 22*b* of the shroud 22, and adapted to come into contact with the first vertical wall 52 in the horizontal direction, as shown in FIGS. 5, 11 and 12.

Further, as best shown in FIG. 5, the first vertical wall 52 of the catch portion 22*b* of the shroud 22 is formed to extend obliquely rearward and laterally outward (see FIGS. 9 and 10). In other words, the first vertical wall 52 is formed to extend obliquely and laterally outward relative to a rearward direction of the vehicle 1. Correspondingly, the vertical surface 12*y* of the contact portion 12*b* of the headlamp housing 12*b* is formed to extend obliquely rearward and laterally outward (see FIGS. 5 and 7).

As above, in the front structure 10 of the vehicle 1 according to this embodiment, where the headlamp 12 is arranged on the lateral side of the shroud 22, and the headlamp housing 12*a* receiving therein the headlight 12 the contact portion 12*b* is formed with the contact portion 12*b* located below the front lateral end 14*a* of the hood panel 14 in the fully closed position, as shown in FIG. 5, the upper region of the side wall 22*a* of the shroud 22 is formed with the catch portion 22*b* protruding above and in adjacent relation to the contact portion 12*b* of the headlamp housing 12*a*. Thus, even if the headlamp 12 is moved in the inward direction of the vehicle body or detached from the vehicle body due to an external impact force applied, for example, in the rearward or lateral direction, and likely to be moved upward, such an upward movement will be restricted by a contact between the catch portion 22*b* of the shroud 22 and the contact portion 12*b* of the headlamp housing 12*a* to prevent the hood panel 14 from being additionally damaged. In addition, this effect can be obtained only by forming the catch portion 22*b* onto an existing shroud 22 without an increase in the number of components.

In the above embodiment, as shown in FIGS. 4 and 5, the catch portion 22*b* of the shroud 22 is fastened to the front end of the lamp bracket 24 connected to the upper frame (a certain part of a vehicle-body member) 23 to support the headlamp housing 12*a*. Thus, the rigidity of the catch portion 22*b* can be increased to ensure the upward-movement restricting function for the headlamp housing 12*a*, while providing enhanced supporting rigidity for the head lamp 12.

In the above embodiment, as shown in FIGS. 10 & 11, the catch portion 22*b* having in a horizontally elongated C shape in vertical cross-section (or a horizontally elongated rectangle with one side open) defined by the upper horizontal wall 51, the first vertical wall 52 and the lower horizontal wall 53 is formed therein with the ribs 55 extending vertically while connecting with the first vertical wall 52. This makes it possible to allow the catch portion 22*b* to have enhanced load bearing capacity against a load to be imposed thereon in an upward direction, i.e., enhanced upward-movement restricting function for the headlamp housing 12*a*.

Further, as shown in FIG. 10, the ribs 55 are also formed on the second vertical wall 54 continuous with the lower horizontal wall 53. This makes it possible to allow the second vertical wall 54 to have enhanced load bearing capacity against a load to be imposed thereon in a rearward direction, i.e., enhanced rearward-movement restricting function for the headlamp housing 12*a*, while allowing the catch portion 22*b* to have enhanced load bearing capacity against a load to be imposed thereon in an upward direction, i.e., enhanced upward-movement restricting function for the headlamp housing 12*a*.

In the above embodiment, as shown in FIGS. 5, 7 and 8, the contact portion 12*b* of the headlight housing 12*a* is formed to have the horizontal surface 12*x* adapted to come into contact with the lower horizontal wall 53 of the catch portion 22*b* of the shroud 22. Thus, the upward movement of the headlight housing 12*a* can be reliably restricted by a vertical contact between the lower horizontal wall 53 and the horizontal surface 12*x*. Further, as shown in FIGS. 5, 7 and 8, the contact portion 12*b* of the headlight housing 12*a* is formed to have the vertical surface 12*y* adapted to come into contact with the first vertical wall 52 of the catch portion 22*b* of the shroud 22. Thus, the rearward movement of the headlight housing 12*a* can be reliably restricted by a horizontal contact between the first vertical wall 52 and the vertical surface 12*y*. These structures make it possible to further reliably prevent damages in the hood panel 14.

In the above embodiment, as shown in FIGS. 5, 9, and 10, the first vertical wall 52 of the catch portion 22 of the shroud 22 is formed to extend obliquely rearward and laterally outward. Thus, for example, the headlight housing 12*a* applied with an impact force in the rearward direction, is guided laterally outward by the first vertical wall 52. Further, for example, the headlight housing 12*a* applied with an impact force in the lateral direction, is guided frontward by the first vertical wall 52. In either case, this structure makes it possible to further reliably prevent the problem that the headlamp 12 is moved laterally inward due to an impact force applied thereto and thereupon the headlight housing 12*a* pushes the hood panel 14 upward.

In summary, the present invention provides a front structure of a vehicle which is provided with a pair of right and left front-side frames, a shroud installed between respective front ends of the side frames, a pair of right and left headlamps each arranged on a lateral side of a corresponding one of laterally opposite sidewalls of the shroud, a headlamp housing serving as an outer shell of the front structure, and a hood panel adapted to cover above the shroud when it is in a fully closed position. In this front structure, each of the headlamp housings has a contact portion located below a corresponding front lateral ends of the hood panel in the fully closed position, and each of the sidewalls of the shroud has an upper region provided with a catch portion which is disposed above and in opposed relation to the contact portion of a corresponding one of the headlamp housings and adapted to come into contact with the contact portion when the headlamp housing is applied with external impact force, so as to restrict an upward movement of the headlamp.

In one preferred embodiment of the present invention, the front structure further includes a pair of right and left lamp brackets each connected to a corresponding one of the side frames and a given vehicle-body member while supporting a corresponding one of the headlamp housings, and each of the catch portions of the shroud is fastened to an front end of a corresponding one of the lamp brackets.

In another preferred embodiment of the present invention, each of the catch portions of the shroud is formed in a horizontally elongated C like shape in vertical cross-section which has: an upper horizontal wall extending from a corresponding one of the sidewalls of the shroud toward above the contact portion of a corresponding one of the headlamp housings; a first vertical wall extending downward from an front edge of the upper horizontal wall while connecting with the sidewall; and a lower horizontal wall extending rearward from a lower edge of the first vertical wall while connecting with the sidewall. Further, the catch portion is formed therein with a rib which extends vertically between the upper horizontal wall and the lower horizontal wall while connecting with the first vertical wall.

In a further preferred embodiment of the present invention, the catch portion further includes a second vertical wall extending downward from a rear edge of the lower horizontal wall while connecting with the sidewall. The rib is formed to extend integrally to the second vertical wall beyond the lower horizontal wall.

In a further preferred embodiment of the present invention, each of the contact portions of the headlight housings has a horizontal surface adapted to come into contact with the lower horizontal wall of a corresponding one of the catch portions of the shroud, and a vertical surface adapted to come into contact with the first vertical wall of the catch portion.

In a further preferred embodiment of the present invention, the first vertical wall in each of the catch portions of the shroud is formed to extend obliquely rearward and laterally outward.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

As described in detail based on the specific embodiment, the present invention can provide a vehicle front structure capable of prevent a headlamp arranged outside a shroud from being moved upward to cause damages in a hood panel. Thus, the present invention has a wide industrial applicability in the technical filed of a vehicle front structure having a headlamp arranged on a lateral side of a shroud.

This application is based on Japanese Patent Application Serial No. 2005-306759, filed in Japan Patent Office on Oct. 21, 2005, the contents of which are hereby incorporated by reference.

What is claimed is:

1. A front structure of a vehicle, comprising:
a pair of right and left front side frames;
a shroud installed between respective front ends of said side frames;
a pair of right and left headlamps each arranged on a lateral side of a corresponding one of laterally opposite sidewalls of said shroud and provided with a headlamp housing serving as an outer shell thereof; and
a hood panel adapted to cover above said shroud when it is in a fully closed position,
wherein:
each of said headlamp housings has a contact portion located below one of opposite front lateral ends of said hood panel in the fully closed position; and
each of the sidewalls of said shroud has an upper region provided with a catch portion which is disposed above the contact portion of a corresponding one of said headlamp housings such that the catch portion is not in contact with the contact portion, and said contact portion is adapted to come into contact with said contact portion when an external impact force is applied to said headlamp housing so as to restrict an upward movement of the headlamp.

2. A front structure of a vehicle, comprising:
a pair of right and left front side frames;
a shroud installed between respective front ends of said side frames;
a pair of right and left headlamps each arranged on a lateral side of a corresponding one of laterally opposite sidewalls of said shroud and provided with a headlamp housing serving as an outer shell thereof;
a hood panel adapted to cover above said shroud when it is in a fully closed position; and
a pair of right and left lamp brackets, each of which being connected to a corresponding one of said side frames and a certain part of a vehicle-body member while supporting a corresponding one of said headlamp housings, wherein
each of said headlamp housings has a contact portion located below one of opposite front lateral ends of said hood panel in the fully closed position,
each of the sidewalls of said shroud has an upper region provided with a catch portion which is disposed above the contact portion of a corresponding one of said headlamp housings and adapted to come into contact with said contact portion when an external impact force is applied to said headlamp housing so as to restrict an upward movement of the headlamp, and
each of the catch portions of said shroud is fastened to a front end of a corresponding one of said lamp brackets.

3. A front structure of a vehicle, comprising:
a pair of right and left front side frames;
a shroud installed between respective front ends of said side frames;
a pair of right and left headlamps each arranged on a lateral side of a corresponding one of laterally opposite sidewalls of said shroud and provided with a headlamp housing serving as an outer shell thereof; and
a hood panel adapted to cover above said shroud when it is in a fully closed position, wherein
each of said headlamp housings has a contact portion located below one of opposite front lateral ends of said hood panel in the fully closed position,
each of the sidewalls of said shroud has an upper region provided with a catch portion which is disposed above the contact portion of a corresponding one of said headlamp housings and adapted to come into contact with said contact portion when an external impact force is applied to said headlamp housing so as to restrict an upward movement of the headlamp, and
each of the catch portions of said shroud is formed in a rectangle like shape in vertical cross section which has: an upper horizontal wall extending from a corresponding one of the sidewalls of said shroud in a direction above the contact portion of a corresponding one of said headlamp housings; a vertical wall extending downward from an front edge of said upper horizontal wall while connecting with said sidewall; and a lower horizontal wall extending rearward from a lower edge of said vertical wall while connecting with said sidewall, said catch portion being internally formed with a rib which extends vertically between said upper horizontal wall and said lower horizontal wall while connecting with said vertical wall.

4. The front structure as defined in claim 3, wherein said catch portion further includes a second vertical wall extending downward from a rear edge of said lower horizontal wall while maintaining a connection with said sidewall; and said rib is formed to continuously extend to said second vertical wall beyond said lower horizontal wall.

5. The front structure as defined in claim 3, wherein each of the contact portions of said headlight housings has a horizontal surface adapted to come into contact with the lower horizontal wall of a corresponding one of the catch portions of said shroud, and a vertical surface adapted to come into contact with the vertical wall of said catch portion.

6. The front structure as defined in claim 5, wherein said vertical wall in each of the catch portions of said shroud is formed to extend obliquely rearward and laterally outward.

7. The front structure as defined in claim 1, further comprising a lens portion that covers a frontal surface of each of said headlamps, wherein each of said headlamp housings covers areas of each of said headlamps other than an area covered by each of said lens portions and a rear end of each of said lens portions is connected to a front end of each of said headlamp housings.

* * * * *